United States Patent Office

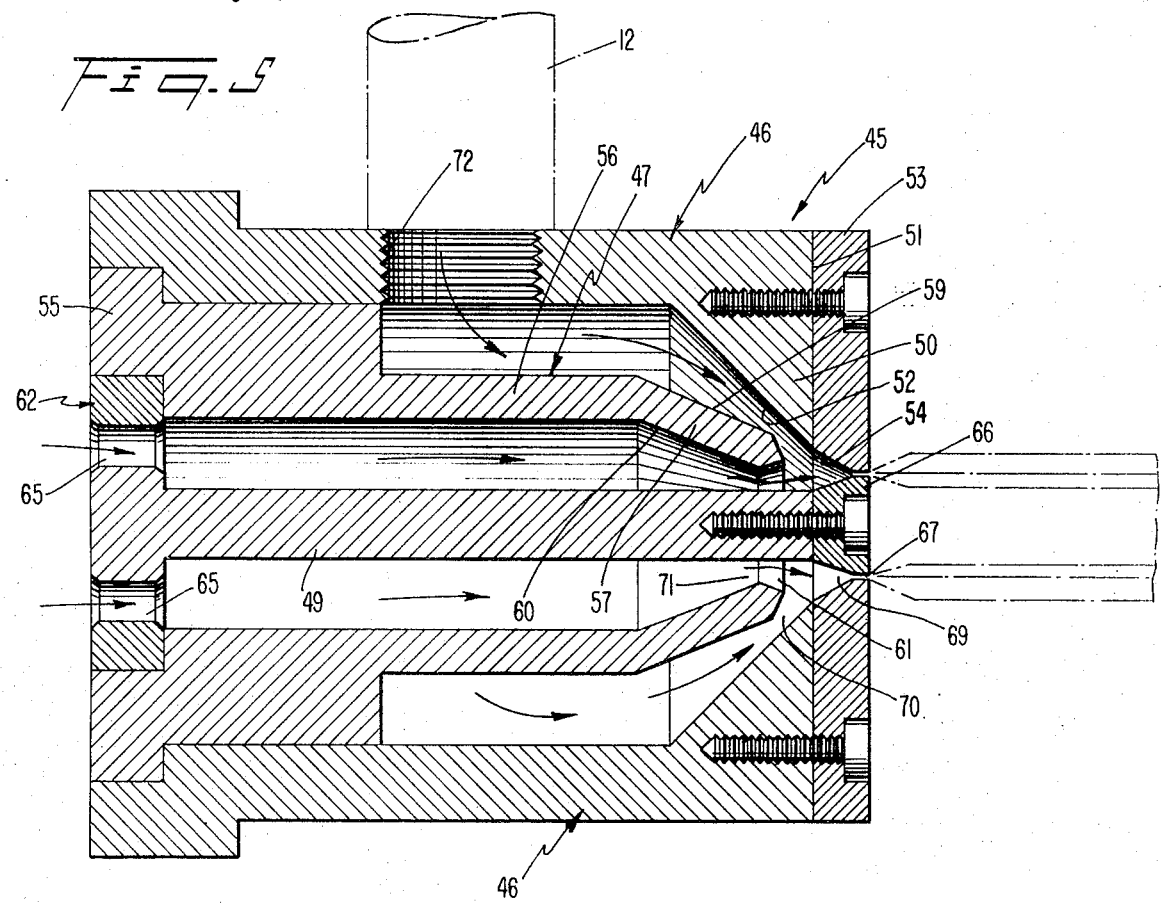
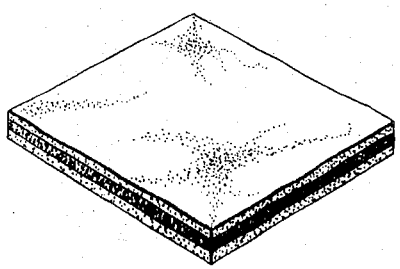
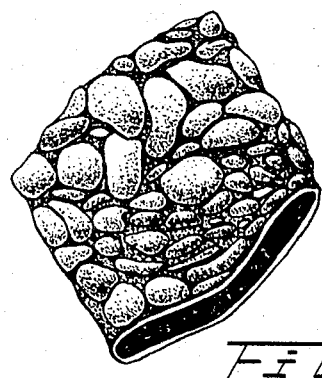
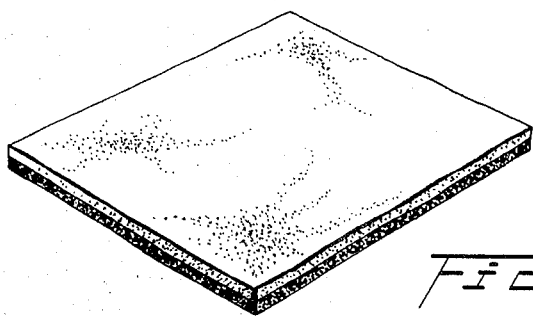

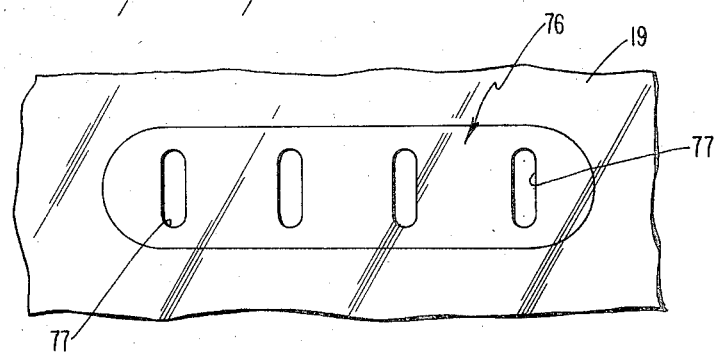
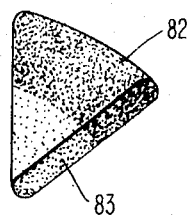
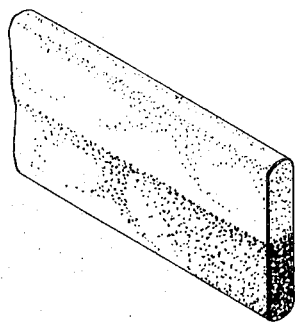
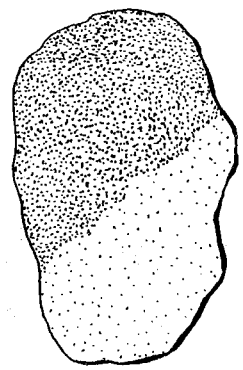
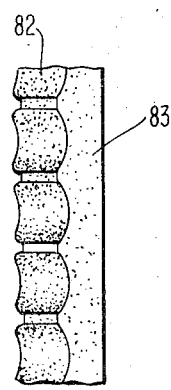
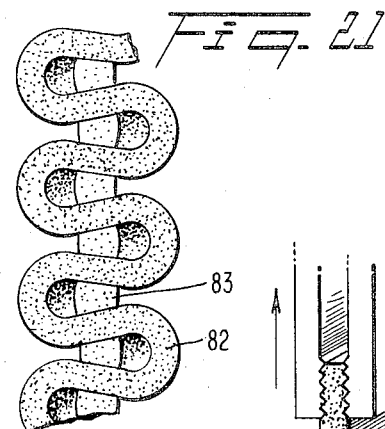
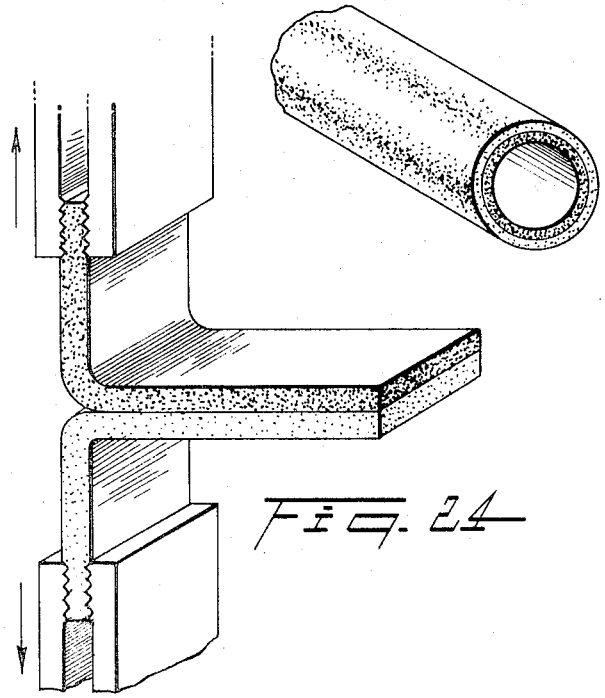
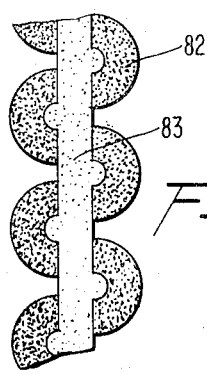

3,851,084
Patented Nov. 26, 1974

3,851,084
METHOD OF PRODUCING LAMINATED COMESTIBLE PRODUCTS
Jack L. Rossen, Englewood, Robert C. Miller, Ringwood, and Gary Gellman, Pomona, N.J., assignors to Nabisco, Inc., New York, N.Y.
Filed July 5, 1972, Ser. No. 269,259
Int. Cl. A23l 1/18
U.S. Cl. 426—343                     17 Claims

ABSTRACT OF THE DISCLOSURE

A method of producing laminated cereal and snack food products which retain their integrity during packaging, shipping and handling wherein a plurality of dissimilar homogenous viscous molten doughs containing free starch molecules are coextruded under high pressure and total laminar flow conditions to produce a bond between two contacting layers which is stronger than the internal bond strength of the weaker of the two layers.

BACKGROUND OF THE INVENTION

The present invention relates to extruded comestible products, and, more particularly to the production of laminar products which are formed by coextruding a plurality of doughs.

In the highly competitive breakfast cereal and snack food industry there is a continuing effort to produce new products having customer appeal by virtue of increased nutritional value, novel and more appealing taste and texture, and novel appearance. One type of cereal and snack product which has been considered is formed by laminating layers of differing doughs and puff drying sections of the resulting laminate. It has been proposed that the individual layers may have different flavors, may have different textures, may be formed of substantially different materials, or may be different colors. By incorporating different tastes or flavors in each of the individual layers, each of the tastes is individually present when the product is eaten. If the flavors were combined in a single layer they would tend to blend so that their individual characters would be lost or submerged into a combined flavor. When the individual layers are composed of materials which have different textures, a product can be provided which has a new and pleasing "mouth feel" as the two materials are chewed simultaneously. By forming the layers of different cereals and/or flours the nutritional value of the product can be controlled. Also, materials which require different processing conditions (e.g. different cooking times or conditions) can be readily combined in a single product by individually processing the materials and laminating the doughs after processing.

One problem in producing such laminated products has been in providing a bond between the layers which is strong enough to prevent separation of the layers during subsequent processing and handling.

In the food art, lamination of edible doughs has been achieved in the past by adhesively bonding the laminates. One type of lamination is disclosed in U.S. Pat. 3,213,808 wherein pastry doughs are laminated by coextrusion. In this process it is evident that the gluten present in the raw pastry doughs adhesively bonds the laminates. While such a bond is sufficient to enable a piece of pastry to maintain its integrity under the subsequent gentle handling it receives, such a bond would normally not be sufficiently strong to withstand the force to which cereal and snack food half products are subject to during flaking or puffing.

U.S. Pat. 3,499,766 discloses a process for adhesively bonding a laminar cereal or snack food. In this process two doughs are coextruded and the degree of adhesion necessary to prevent delamination upon puff flow drying is achieved by minimizing resistance to induce plug flow and at the same time inducing turbulence to cause intermixing of the two doughs at the contacting surface during extrusion. Another critical feature of this process is the use of an extrusion die which allows only gradual expansion of the extrudate. In this process, adhesion is developed due to hydration and gelatinization of starch or by the inclusion of conventional dough binding ingredients.

SUMMARY OF THE INVENTION

It is an object of the present invention to provide a novel process for producing strongly bonded laminar comestible products.

Another object is to strongly bond comestible doughs which are coextruded under conditions producing total laminar flow.

Another object is to strongly bond two comestible without adding adhesive ingredients for that purpose.

Another object is to provide a process wherein dissimilar doughs are processed and coextruded in a manner such that the bond between the dough layers is stronger than the internal bond strength of the weaker of the dough layers.

Another object is to provide a process for producing laminated products of novel shape.

Another object is to provide a process for laminating doughs having dissimilar puff drying expansion characteristics by coextruding the doughs in a manner such that the dough layers are bonded with sufficient strength to prevent delamination upon warping of the extrudate during puff drying.

Another object is to provide a coextrusion process for laminating doughs which have substantially different viscosities so that they flow through the extrusion die at substantially different velocities.

The foregoing objects are accomplished by differently formulating and/or processing edible materials to produce different viscous molten doughs, bringing the dissimilar doughs together to produce a layered stream and coextruding the layered stream, under conditions producing laminar flow and a high pressure to strongly bond the contacting dough layers. By utilizing doughs which are subject to different degrees of expansion upon subsequent processing layered half products are produced which expand unevenly to produce unusually shaped products. By utilizing doughs of significantly different viscosity curved or curled products are produced.

BRIEF DESCRIPTION OF THE DRAWINGS

The invention will be described with reference to the drawings wherein:

FIG. 5 is an elevational sectional view of a coextrusion head for use in accordance with the present invention to produce a layered tubular extrudate.

FIG. 6 shows a section of three layer extrudate produced by the use of the extrusion head of FIG. 2.

FIG. 7 shows the final product resulting from hot oil puffing of the extrudate section of FIG. 6.

FIG. 8 shows a section of two layer extrudate produced by use of the extrusion head of FIG. 4.

FIG. 16 is an elevational view of a die insert having a rectangular orifice oriented perpendicularly to the layered stream being extruded therethrough.

FIG. 17 shows a section of two layer extrudate produced by use of the die insert of FIG. 16 with the extrusion head of FIG. 4.

FIG. 18 is a half product formed by coextruding doughs of different color and significantly different viscosities through the die insert of FIG. 16 and periodically cutting the extrudate at the die face.

FIG. 19 is a flake formed by passing the half product of FIG. 18 through flaking rolls.

FIG. 20 is a side view of a ribbon formed by extruding doughs of different viscosities through the die insert of FIG. 16.

FIG. 21 is a top view of the ribbon of FIG. 20.

FIG. 22 is a bottom view of the ribbon of FIG. 20.

FIG. 23 shows a tubular extrudate formed by the coextrusion head of FIG. 5.

FIG. 24 is a schematic diagram of a test set up to test the strength of the bond produced between the layers of extrudate produced according to the present invention.

Referring now to FIGS. 1-3, there is disclosed an extrusion head 10 which can be used in the practice of the present invention.

Figure 1:
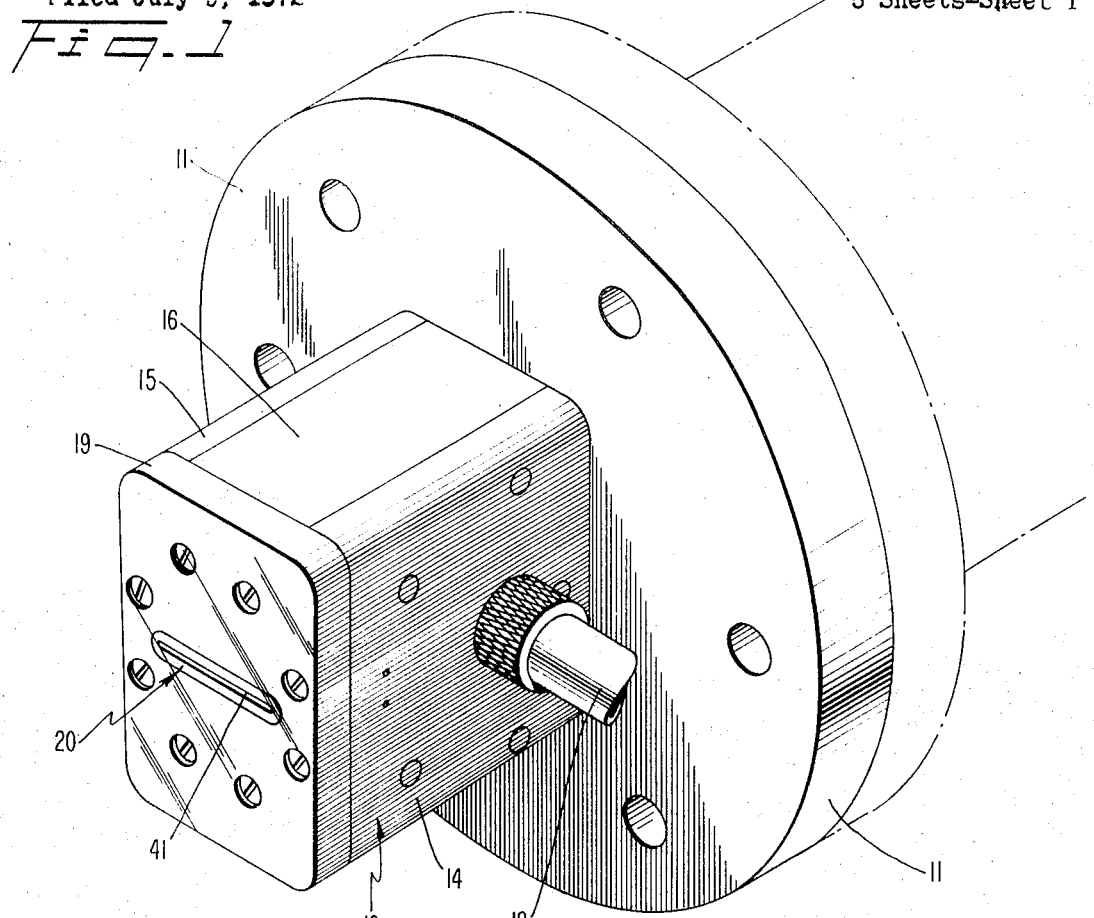
FIG. 1 is a perspective exterior view of a coextrusion head for use in accordance with the present invention.

The head 10 is mounted to the outlet face of an auger type extruder (not shown) by means of a mounting plate 11 and is connected to a second auger type extruder (not shown) by means of a pipe 12. The head 10 comprises a pair of flat side wall plates 14 and 15, top and bottom housing members 16 and 17 having facing contoured surfaces, a die plate 19 and a die insert 20. The housing members 16 and 17 are contoured to define a chamber 21 having an inlet 22 and an outlet slot 24 aligned with the die insert 20. The wall plates, housing members and die plate are secured together by suitably positioned bolts as shown in the drawings. Between the inlet 22 and the outlet 24, the facing surfaces of the housing members 16 and 17 include diverging surface portions 25, parallel surface portions 26, and converging surface portions 27.

Positioned within the chamber 21 is an elongated nozzle member 29 extending between the side plates 14 and 15. The member 29 is generally "U" shaped having a generally triangular base section 30 pointing toward the inlet mouth 22 and a pair of legs 31 extending toward the die insert 20. The legs are slightly tapered and converge to form an elongated tapered chamber 32 having a narrow exit slot 33. The surfaces 27 converge at a greater angle than do the legs 31 so that a narrow slot 34 is formed between each of the surfaces 27 and the end of the adjacent leg 31. The ends of the legs have triangular cross-sections which taper to an apex edge 35. The nozzle member 29 is secured in position within the chamber by means of a bolt 36 extending through the section 30 and pins 37 extending into the legs 31. The wall plate 14 is provided with an opening 39 which communicates with the interior of the chamber 32 and receives the pipe 12 from the second extruder.

The die insert 20 is formed with an extrusion passageway 40 which tapers inwardly from the exit slot 24 of the chamber 21 to a narrow slit 41 at the orifice of the die.

Figure 2:
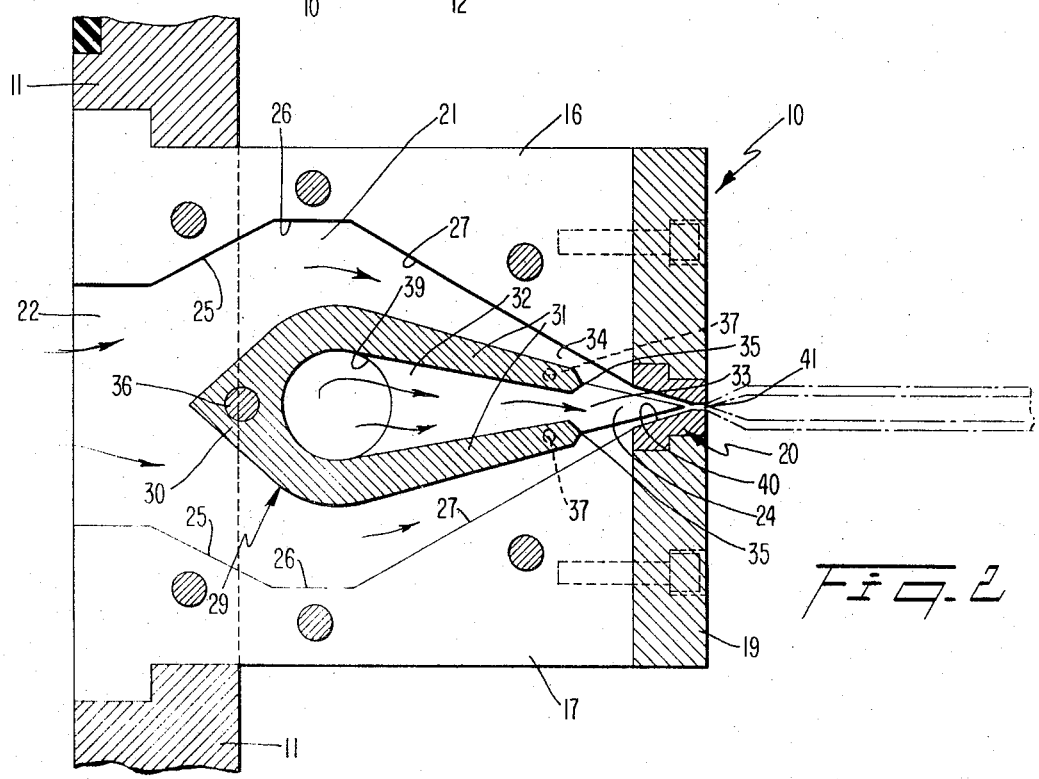
FIG. 2 is an elevational view in section of the extruding head of FIG. 1 arranged to produce a three layer extrudate ribbon.
Figure 3:
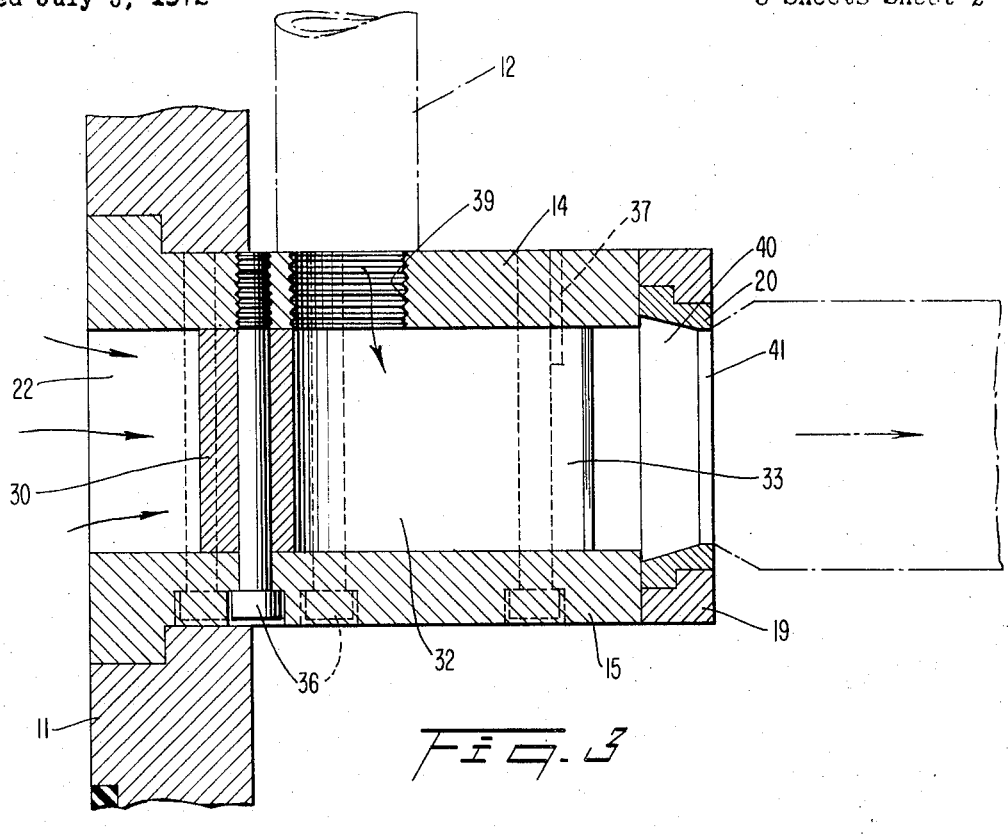
FIG. 3 is a plan view taken along line 3—3 on FIG. 1.
Figure 4:
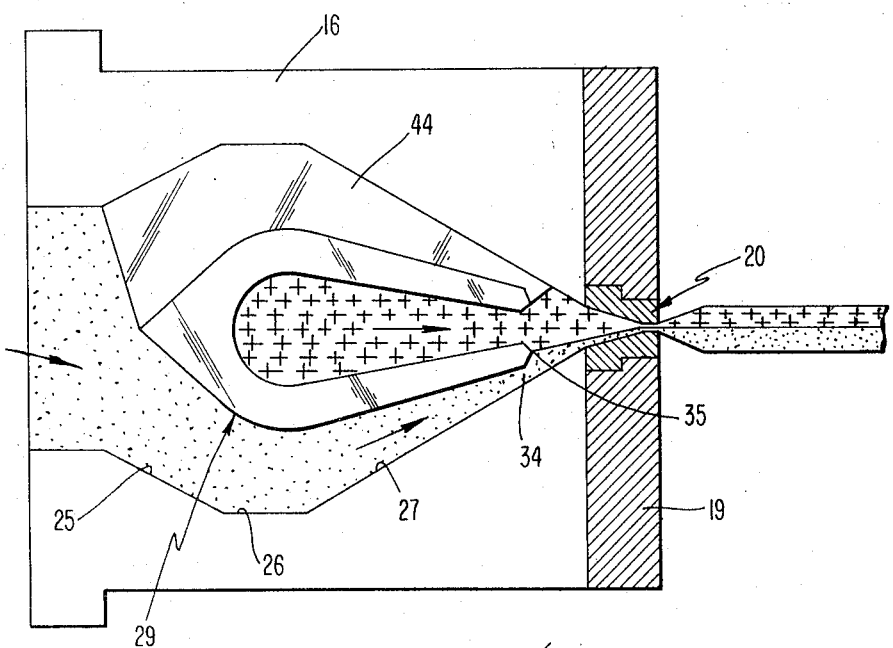
FIG. 4 is an elevational sectional view similar to FIG. 2 of the extruding head arranged to produce a two layer extrudate ribbon.

In FIG. 4, the head 10 of FIGS. 1-3 is shown with a plug 44 positioned between the nozzle member 29 and the housing member 16 to convert the head to extrude a flat two layer stream. The plug 44 extends the full width of the head between the inner surfaces of the walls 14 and 15 and prevents flow through the upper portion of the chamber 21. The relative thickness of the two layers in the extrudate can be adjusted by varying the rates at which the two doughs flow into the head 10. This can be simply accomplished by adjusting the rotational speed of one or both of the extruder augers which are normally driven by electric motor.

FIG. 5 shows a coextrusion head 45 for extruding a layered tubular stream of bonded doughs. The head 45 includes an outer annular housing 46, an inner annular flow separating member 47, and a central cylindrical stem 49. The housing 46 is provided with an inwardly extending tapered annular flange 50 providing a flat housing end face 51 and having an inwardly facing conical surface 52. A circular die plate 53 is bolted to the end face 51 and is provided with a central circular passageway 54. The flow separating member 47 has an annular base portion 55 closely fitting the inner wall of the housing 46, an annular central wall section 56 spaced from the inner wall of the housing 46, and an inwardly tapered annular end section 57. The section 57 has an outer surface 59 and a parallel inner surface 60. The free end of the section 57 is triangular in cross section tapering to an edge 61. The stem 49 extends from an integral circular base 62 which is mounted in a recess 64 at the base end of the member 47 and is provided with a plurality of apertures 65. The stem 49 extends to the plane of the end face 51, and a circular die insert 66 positioned in the passageway 54 is secured to the end of the stem by a bolt.

The passageway 54 and the insert 66 are shaped to provide an annular extrusion orifice passageway 67 having parallel walls and a tapered annular passageway 69 leading from the plane of the face 51 to the orifice passageway 67.

The surface 52 tapers at a greater angle than the flow separator section 57 to form an annular slit 70 between the surface 52 and the free end of the surface 59. Another annular slit 71 is formed between the stem 49 and the free end of the separator section 57.

A threaded opening 72 is provided in the housing 46 for connection of the pipe 12.

The extrusion head 45 is secured to the face of one extruder by a mounting plate to receive a first dough from the extruder through the apertures 54, a threaded opening 72 is provided in the housing 46 to which the pipe 12 is connected to conduct a second dough from the second extruder into the head 45.

It is to be understood that, if desired, the head 45 could be modified to produce a solid concentric extrudate, having a cylindrical center of one dough and a layer of a second dough, by removing the stem 49 and insert 66 and reducing the diameter of the passageway 54 sufficiently to produce high pressure within the head.

In practicing the invention, a cooked or uncooked dough mix or a grain or flour is introduced into each of the first and second auger extruders. The augers in the extruder work the starting materials to produce viscous molten doughs. When the doughs leave the extruders, they contain free starch which has been liberated by rupturing starch cells in the starting materials by cooking, by the shearing action of the extruder auger, or by a combination of these factors. Cooking of the starting material can be accomplished before introduction into the extruder, or it can be accomplished within the extruder by externally applied heat or by the heat generated by the working of the material by the auger. The starting material can be partially cooked before introduction into the extruder and the rupture of the starch cells can be completed by further cooking in the extruder, by the shearing action of the auger, or by combination of the two. The doughs flowing through the extruders are processed differently or are different in composition, or both. The doughs experience different processing when the cooking times or methods are different or when the extruders used for the two doughs have different geometry or are run at different speeds or produce different temperatures or the like. The extruders and the processing of the input materials are chosen to place the two doughs in a molten homogenous state.

The viscous molten doughs exiting the auger extruders flow out of contact with air and under high pressure into the co-extrusion head. In the embodiments shown in FIGS. 1–4, the flow from one extruder enters the head through the inlet 22 of the chamber 21 and the flow from the second extruder moves through the pipe 12 into the chamber 32. The first dough flows around the nozzle member 29 and through the slots 34 (or the single slot 34 in FIG. 4) between the surfaces 27 and the legs 31. The slot 34 restricts flow to equalize pressure in the chamber 21 across the full width of the slot so as to provide uniform flow through the slot. The second dough flows through the exit slot 33 of the chamber 32 which also acts as a restriction to provide uniform flow.

Downstream of the slots 33 and 34 the two flows meet at the apex edge 35 of the legs (or leg) 31 and move in a layered flow of decreasing cross-sectional area to and through the narrow extrusion orifice 41.

In the embodiment shown in FIG. 5, the first dough flows through the apertures 65, along the inner surface of the member 47, and through the annular slit 71. The second dough flows through the opening 72, along the outer surface of the member 47, and through the annular slit 70. The slits 70 and 71 restrict flow to equalize pressure in the chambers behind the slits to provide uniform flow through the slits. Downstream of the slits 70 and 71 the two flows meet at the apex edge 61, and move in a tubular layered flow of decreasing cross-sectional area to and through the narrow annular extrusion orifice 67.

At the point in each embodiment where the two dough flows are brought into contact, the doughs are under a high pressure for example 500 lbs. per square inch. The elements of co-extrusion heads 10 and 45 which are in contact with dough are fabricated from chrome plated tool steel with the exception of the die insert 20 which is of brass. The flow of the layered dough stream is given a velocity profile as a result of the friction between the outer dough surface and the metal surfaces. The velocities at which the dough stream moves past a vertical plane varies from a minimum value at the edges of the stream to a maximum value at the center of the stream. Two contacting dough layers usually have different flow characteristics by virtue of differences in formulation or processing and therefore each layer of the combined flow exhibits a different velocity gradient. A fluid stream in laminar flow may be considered to be made up of an infinite number of minute strata in which there is no intermixing of adjacent strata. When a velocity profile exists in laminar flow, each stratum is moving faster than the adjoining outer stratum and slower than the adjoining inner stratum. It would be expected, therefore, in the coextrusion of two doughs by means of the head 10 or 45, that relative movement would take place along the line of contact between the contacting layers as the layered stream flows toward and through the extrusion orifice.

As the layered flow leaves the extrusion orifice it expands, cools and passes from the molten state to a flexible semi-solid state. The extrusion head and die insert shown in FIGS. 1 to 3 produces a three layer ribbon extrudate which may be cut at the die face to produce pieces such as that shown in FIG. 6. The extrusion head and die insert shown in FIG. 4 produces a two layer ribbon extrudate which may be cut at the die face to produce pieces such as that shown in FIG. 8. The extrusion head and die arrangement shown in FIG. 5 produce a tubular extrudate having two concentric layers which may be cut at the die face to produce pieces such as that shown in FIG. 23.

Figure 13:
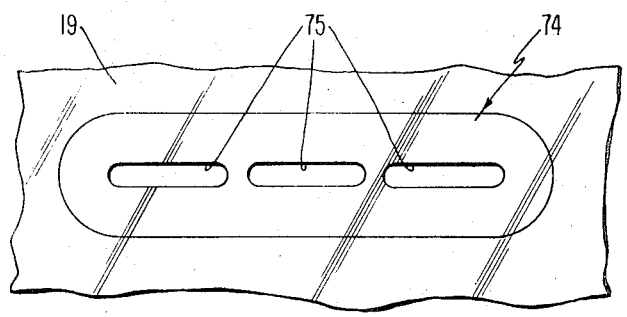
FIG. 13 is an elevational view of a die insert having rectangular orifice parallel with the layered stream through which a two layered ribbon is being extruded.

Die inserts having extrusion orifices of different geometries, for use with the extrusion head of FIGS. 1 to 4, are shown in FIGS. 13 and 16. The insert 74 shown in FIG. 13 is provided with three horizontal slit orifices 75 for simultaneously producing three ribbon shaped extrudate similar, except in size, to the single extrudates produced by the insert 20. The insert 76 shown in FIG. 16 is provided with four vertical slit orifices 77 for simultaneously producing four extrudates in which the layers are in side by side relation. FIG. 17 shows a section of an extrudate produced by using the insert 76 with the two layer extrusion head of FIG. 4. A side by side three layer extrudate would result from using the insert 76 with the extrusion head of FIG. 1.

It is evident that other orifice configurations could be used including zig zag or wavy horizontal slits, or one or more square or round orifices. Likewise, the orifice disclosed in FIG. 5 can be formed in a variety of geometrical patterns. In dies where the geometry of the orifice configuration does not agree with the cross-sectional geometry of the layered stream within the coextrusion head, the tapered portion of the die passageway is formed to provide the necessary transition.

It has been found that the layers of different doughs are securely bonded together with each layer of dough being of uniform consistency up to the line of junction. There is no visible intermixing of the contacting layers, each layer terminating abruptly at the junction line. Tests described hereinafter have shown that the bond between the contacting layers is stronger than the weaker of the two layers. It is believed that the bond between the layers results from intermeshing and/or hydrogen bonding of the starch, and perhaps protein, molecules at the contacting surface.

The coextrusion of two dough layers according to the method of the present invention is believed to result in a weaving of the molecules of the one dough with the molecules of the other dough along the junction line of the two doughs to produce a bond which is stronger than the bond between the molecules of the weaker material. It is possible that such a weaving of molecules could be produced or enhanced by the relative motion of the two doughs along the line of contact as they are brought into contact. Relative movement along the contact line would give the surface molecules an opportunity to catch and interlock.

Another factor which is believed to contribute to molecular intermeshing at the junction line is that the longer molecules tend to become aligned during laminar flow extrusion. As the two doughs flow, the laminar flow condition tends to align the long molecules parallel to the direction of flow. Since the molecules of the different dough streams are aligned in the same direction, when the two streams are brought into contact, the surface molecules of each stream have the same orientation as the spaces between the aligned molecules at the surface of the other stream. When, as the contacting surfaces move with respect to each other, a molecule at one surface registers with a space in the opposing surface, the molecule would tend to move into the space under the high pressure acting on the dough streams.

The alignment of the molecules during extrusion also increases the possibility of hydrogen bonding, and bonds resulting from Van Der Waals forces, being formed between the molecules of the contacting surfaces. The hydrogen atoms are positioned along the sides of the long molecules, and therefore, when the long molecules at both surfaces are aligned in the same direction, the greatest number of hydrogen atoms are positioned to bond with other molecules. The relative movement of the contacting surfaces increases the opportunity of such hydrogen bonds being formed.

A number of different combinations of dough formulations have been utilized in accordance with the present invention to produce laminated comestible products. A strong bond was achieved between the layers of the products produced from each of these combinations. In each case, attempts made to peel the layers apart by hand were unsuccessful.

In producing these products, both cooking and forming extruders were used. The extruders were operated at various speeds to produce flow rates of extrudate from the coextrusion head of between 1 and 3 pounds per minute. The doughs were introduced into the coextrusion head at pressures ranging from 500 to 1200 lbs. per square inch. The ratio of flow rates used were within the range of 1 to 4 and 4 to 1, that is the flow rate of one layer was between one fourth and four times the flow rate of the other layer. The temperature range of the extrudate as it emerged from the die was between 120 and 180 degrees F.

The die inserts successfully used in connection with the extrusion head of FIGS. 1 to 4 included the insert 20 (shown in FIGS. 1 to 4) having a straight horizontal orifice with a vertical dimension of 0.0625 inch and an area of 0.084 square inches; the insert 74 shown in FIG. 13 wherein the three horizontal slit orifices 75 have a vertical dimension of .09 inch and a total area of .086 square inches; and the insert 76 shown in FIG. 16 wherein the four vertically oriented slit orifices 77 have a vertical dimension of .270 inch and a total area of .089 square inches.

In the extrusion head of FIG. 5 the annular orifice had a width of .030 inch and an area of .070 square inches.

The following examples disclose some of the dough formulations used in successfully practicing the invention.

Example #1

Layer A Ingredients:
- Corn Flour — 37 lbs. 8 oz.
- Sugar — 3 lbs.
- Salt — 12 oz.
- Mono-Diglyceride — 6 oz.
- Water — 16 lbs.

Layer B Ingredients:
- Wheat Middlings — 25 lbs.
- Malt Flour — 3 lbs. 9 oz.
- Wheat Germ — 10 oz.
- Disodium Phosphate — 4 oz.
- Mono-Diglyceride — 2 oz.
- Sugar — 4 lbs. 15.5 oz.
- Salt — 7.7 oz.
- Water — 9 lbs.

Example #2

Layer A Ingredients:
- Corn Flour — 37 lbs. 8 oz.
- Sugar — 3 lbs.
- Salt — 12 oz.
- Mono-Diglyceride — 6 oz.
- Water — 16 lbs.

Layer B Ingredients:
- Oat Flour — 30 lbs.
- Modified Starch — 10 lbs.
- Salt — 1 lb.
- Sugar — 5 lbs.
- Mono-Diglyceride — 4 oz.
- Water — 15 lbs.

Example #3

Layer A Ingredients:
- Wheat Flour — 11 lbs. 11 oz.
- Sugar — 2 lbs. 5 oz.
- Salt — 2 oz.
- Malt Flour — 4 oz.
- Vanillin — 0.1 oz.
- Wheat Gluten — 1 lb. 10 oz.
- Wheat Germ — 4 lbs. 11.2 oz.
- Soya Protein — 9 lbs. 5.4 oz.
- Water — 5 lbs. 4 oz.

Layer B Ingredients:
- Rolled Oats — 15 lbs. 5 oz.
- Salt — 3 oz.
- Malt Flour — 3 oz.
- Vanillin — 0.2 oz.
- Soya Protein — 8 lbs. 5 oz.
- Wheat Flour — 6 lbs. 2 oz.
- Water — 5 lbs. 10 oz.

The layer A ingredients were mixed, batch cooked, and fed into a forming extruder which delivered the dough to the coextrusion head.

The layer B ingredients were mixed, batch cooked, and fed into another forming extruder which delivered the dough to the coextrusion head.

Example #4

Layer A Ingredients:
- Rice Flour — 12 lbs. 8 oz.
- Wheat Flour — 8 lbs. 12 oz.
- Modified Starch — 2 lbs. 8 oz.
- Mono-Diglyceride — 3 oz.
- Sugar — 1 lb.
- Salt — 6 oz.
- Water — 10 lbs.

Layer B Ingredients:
(Same as Layer A).

The ingredients were mixed and divided into equal portions. The layer A portion was cooked in a cooking extruder and collected to be fed later into a forming extruder. The layer B portion was cooked in the cooking extruder and was fed directly from the extruder into the coextrusion head while the layer A dough was fed to the coextrusion head by the forming extruder.

Example #5

Layer A Ingredients:
- Potato Flakes — 12 lbs.
- Modified Starch — 2 lbs.
- Water — 7 lbs. 8 oz.
- Salt — 12 oz.

Layer B Ingredients:
(Same as Layer A).

The ingredients were mixed and divided into equal portions. The layer A portion was fed to the coextrusion head via a forming extruder while the layer B portion was fed to the coextrusion head via another forming extruder of different construction.

Example #6

Layer A Ingredients:
- Rice Flour — 12 lbs. 8 oz.
- Wheat Flour — 10 lbs. 12 oz.
- Mono-Diglyceride — 3 oz.
- Sugar — 1 lb.
- Red Color — 1 gram
- Water — 9 lbs.

Layer B Ingredients:
- Potato Flakes — 12 lbs.
- Modified Starch — 2 lbs.
- Salt — 12 oz.
- Yellow Color — 1 gr. 7 oz.
- Water — 1 gr. 7 oz.

The layer A ingredients were mixed, cooked in a cooking extruder and fed directly from the extruder to the coextrusion head. The layer B ingredients were mixed and fed to the coextrusion head via a forming extruder.

Example #7

Layer A Ingredients:

| | |
|---|---|
| Rice Flour | 12 lbs. 8 oz. |
| Wheat Flour | 8 lbs. 12 oz. |
| Wheat Starch | 2 lbs. |
| Mono-Diglyceride | 2 oz. |
| Sugar | 2 lbs. |
| Salt | 8 oz. |
| Citric Acid | 2 oz. |
| Red Coloring | 0.25 grams |
| Water | 10 lbs. |

Layer B Ingredients:

| | |
|---|---|
| Rice Flour | 12 lbs. 8 oz. |
| Wheat Flour | 8 lbs. 12 oz. |
| Wheat Starch | 2 lbs. |
| Mono-Diglyceride | 2 oz. |
| Sugar | 2 lbs. |
| Salt | 8 oz. |
| Citric Acid | 2 oz. |
| Yellow Coloring | 0.40 grams |
| Water | 10 lbs. |

The layer A (red formulation) ingredients were mixed, cooked in a cooking extruder and collected. The layer B (yellow formulation) ingredients were mixed, cooked in the cooking extruder and fed directly from that extruder into the coextrusion head while the cooked layer A dough was fed to the head by a forming extruder. The density of these doughs was approximately 80 pounds per cubic foot.

The bond strength produced by the method of the present invention was tested on the extrudate produced by Example 7. In this run the coextrusion head shown in FIG. 4 was used with the die insert of FIG. 13.

The forming extruder was run at 30 r.p.m. and the cooking extruder at 68 r.p.m. during the coextrusion. A pressure of 500 p.s.i. was developed in the zone immedialy downstream of the nozzles 33 and 34 and the flow rate of the extrudate was 2 lbs. per minute total or ⅔ lb. per minute per orifice.

Test samples were prepared by taking a section of the two layer extrudate, and, with a razor blade, carefully cutting along the full width of the bond for a distance of ¾ inch from one end of the section as shown in FIG. 24. The free ends of the individual separated layers were each placed in one of the two pairs of jaws of an Instron tensile tester. The two pairs of jaws were initially spaced 1 inch apart and during the test were moved away from each other at a rate of 2 inches per minute in an attempt to peel the two layers apart. This test was performed twice and each time layer B (the yellow layer) failed in tension with no apparent further separation or peeling of the two layers along the bond line. The unit strength of layer B was approximately 1.5 lbs. per inch of width. The tests on the two samples were conducted 9 and 14 minutes respectively after extrusion.

The average viscosity of the extruded stream was computed to be 72.1 pounds per inch second and the Reynolds number of the layered flow was computed to be $2.57 \times 10^{-4}$. The Reynolds number for turbulent flow is approximately 2100, therefore, it can be seen that the flow under consideration was seven orders of magnitude below the turbulent region.

With reference to Example 6, these doughs were coextruded through the head disclosed in FIG. 4 at different extruder speeds using first the die insert 20 and then the die insert 76 (FIG. 16) while measuring the pressures of the individual dough streams and the pressure of the combined dough stream just downstream of the apexes 35. The cooking extruder speed was run at 56 and 80 r.p.m. while the forming extruder was run at about 15 r.p.m. and 32 r.p.m. The pressures of the single dough streams were between a maximum of 1100 p.s.i. and a minimum of 600 p.s.i. while the pressure of the combined flow was between 980 p.s.i. and 580 p.s.i. The residence times, calculated for a flow rate of 2 lbs. per minute, show that the individual streams require about 4 seconds to flow from center of the head (in the vicinity of the surface 26) to the slots 33 and 34 and the combined stream requires about 0.5 seconds to flow from the apex 35 through the die orifice. Excellent bonding of the two layers was achieved on each of these runs.

The extrudate issuing from the die orifice is separated into pieces and is subjected to further processing such as puffing, flaking, and/or toasting to produce a finished edible product.

Novel products are formed by coextruding doughs subject to different degrees of expansion upon puff drying. A novel product is produced by coextruding a three layer ribbon in which the inner layer is of a highly expansible dough while the outer layers are of a dough which expands to a lesser degree when subjected to puffing. The extruded ribbon is cut into pieces as shown in FIG. 6 and then dried until the moisture content thereof is reduced to a value which will produce satisfactory puffing. The pieces are then fried in hot oil or otherwise treated to vaporize the moisture within the product producing the puffing effect shown in FIG. 7.

Figure 9:
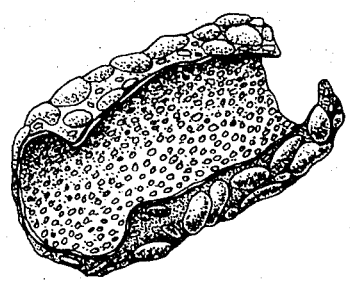
FIG. 9 shows the product resulting from puffing of a two layer extrudate section as shown in FIG. 8 wherein the different doughs are subject to different degrees of expansion upon puff drying.
Figure 10:
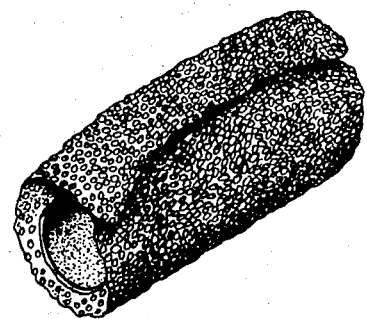
FIG. 10 shows a product similar to that of FIG. 9 which results from puffing a two layer extrudate section in which the layer of dough subject to the greatest expansion is substantially thicker than the other layer.

FIGS. 9 and 10 show a product having a curled configuration which is produced from pieces of a two layer extrudate (such as that shown in FIG. 8) in which one layer is composed of a highly expansible dough while the other layer is of a less expansible dough. After proper drying, the pieces are puffed and the unequal expansion of the doughs causes the pieces to curl. The degree of curl is dependent upon the relative expansibility of the doughs used and upon the relative thickness of the individual layers.

Figure 11:
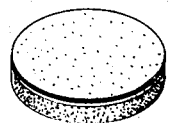
FIG. 11 shows a circular section cut from a ribbon of two layer extrudate.
Figure 12:
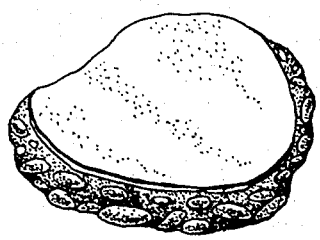
FIG. 12 shows a product resulting from puffing a section as shown in FIG. 11 in which the lower layer is subject to a greater degree of expansion than the upper layer.

FIG. 11 shows a circular piece cut from a ribbon of two layer extrudate in which the dough of the lower layer is subject to greater expansion than that of the upper layer. After drying the piece is puffed to form the unusually shaped product shown in FIG. 12.

Figure 14:
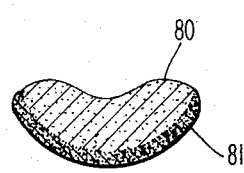
FIG. 14 is a cross-sectional view of extrudate formed by coextruding two doughs of significantly different viscosities through the die insert of FIG. 13.
Figure 15:
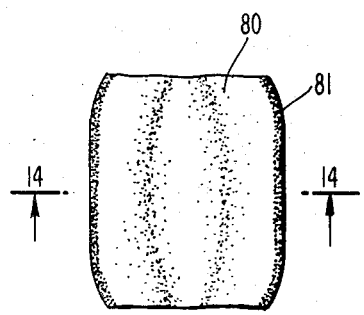
FIG. 15 is a plan view of a half product formed by periodically cutting the extrudate of FIG. 14 at the die face.

Products of novel shape are also formed by coextruding doughs having substantially different viscosities. The product shown in FIGS. 14 and 15 is formed by coextruding, through the horizontal die orifice shown in FIG. 13, two doughs of different viscosities. The upper layer dough 80 has a high viscosity relative to that of the lower layer 81, and the greater velocity of the lower layer causes the extrudate to curl upwards along the edges. The extrudate is cut periodically at the die face to form the pieces shown in FIGS. 14 and 15 which resemble half a nut. These pieces can be toasted or fried to produce final products having a shape the same as, or similar to, that shown.

Other novel products are produced by coextruding doughs of different viscosities through the vertically oriented die orifice as shown in FIG. 16. The product shown in FIG. 18 is formed by coextruding two doughs of which the upper layer dough 82 has a low viscosity with respect to the lower layer dough 83. The greater velocity of the upper layer causes the extrudate to curl downward. The extrudate is cut at the die face at short intervals to produce generally triangular extrudate pieces which resembles "chicken corn" candy, when doughs of different color are used. A novel two color flake product is formed by passing the two color triangular extrudate piece of FIG. 18 between flaking rolls. The resulting flakes, one of which is shown in FIG. 19, have one portion which is solidly of one color and a second portion which is solidly of the other color, the two colors meeting at a clearly defined line of demarkation.

Another novel product is formed by extruding two doughs as discussed in connection with the product of FIG. 18 and cutting the extrudate at longer time intervals. The unequal velocities of the two layers causes the lower viscosity material 82 to bend in a serpentine manner to form the product shown in FIGS. 20, 21 and 22.

It will be seen from the foregoing description that the present invention accomplishes all of the objectives set forth hereinbefore.

It is to be understood that all matter herein is to be interpreted as illustrative and not in any limiting sense.

We claim:

1. A method of producing laminated food products which comprises the steps of processing edible dough forming starch containing materials to produce a plurality of dissimilar doughs each of which is in a viscous molten state, moving streams of said different doughs under high fluid pressure into contact to form a layered stream of dough, and moving said layered stream through a restricted passageway under conditions producing total laminar flow to strongly bond the contacting different dough layers.

2. A method of producing laminated food products which comprises the steps of processing edible dough forming starch containing materials to produce a plurality of dissimilar doughs each of which is in a viscous molten state, moving streams of said different doughs under high fluid pressure into contact to form a layered stream of dough, and moving said layered stream through a restricted passageway under total laminar flow conditions and under sufficient pressure to produce a bond between the contacting different doughs which is stronger than the internal bond strength of the weaker of the doughs.

3. The method of claim 2 including the steps of dividing the bonded stream transversely into pieces and flaking the pieces.

4. The method of claim 2 including the steps of dividing the stream transversely into pieces and puffing the pieces.

5. The method of claim 2 wherein said materials contain unruptured starch cells before processing and said processing ruptures the starch cells to free the starch molecules therein.

6. The method of claim 2 wherein the layered stream is moved through said passageway under a pressure of at least about 500 p.s.i.

7. The method of claim 2 wherein said dissimilar doughs are differently formulated to experience different degrees of expansion upon puffing and including the steps of dividing the bonded stream into pieces and puffing the pieces, wherein the bonded stream is formed and divided into pieces such that the shape of the pieces is distorted by the unequal expansion of the doughs upon puffing.

8. The method of claim 7 wherein the bonded stream comprises contacting flat layers of said different doughs.

9. The method of claim 8 wherein the bonded stream comprises only two layers of dough and is divided into pieces which are dimensioned so as to warp into a curved shape in response to unequal expansion of the doughs upon puff drying.

10. The method of claim 2 wherein the dissimilar doughs have different viscosities and the configuration of the bonded stream is such that the stream warps upon emergence from the restricted passageway.

11. The method of claim 2 wherein the different doughs have different visual appearances and including the steps of dividing the extruded stream into pieces having two major opposing surfaces each of which exhibit each of the different doughs and flaking the pieces so that the major opposing surfaces are pressed toward each other to produce a flake having each of the different doughs present on each of the surfaces thereof.

12. The method of claim 10 wherein the bonded stream comprises two contacting flat layers of said dissimilar doughs and said restricted passageway includes an elongated slot having its major axis parallel to the junction line of said layers whereby the lower viscosity dough layer of the extrudate tends to curl around the higher viscosity dough layer upon emergence from said slot whereby the extrudate is convex on one surface and has a concavity on the opposite surface.

13. The method of claim 12 including the step of slicing the extrudate at the outer surface of the slot at short time intervals to produce pieces with tapered ends resembling half of a nut.

14. The method of claim 10 wherein the bonded stream comprises two contacting flat layers of said dissimilar doughs and said restricted passageway includes an elongated slot having its major axis perpendicular to the junction line of said layers whereby the extrudate flows more rapidly at one end of its major axis than at the other end.

15. The method of claim 14 including the step of slicing the extrudate at the outer surface of said slot at short time intervals to form generally triangular pieces.

16. The method of claim 14 including the step of slicing the extrudate at the outer surface of said slot at long time intervals to allow the low viscosity material to curve laterally with respect to the high viscosity material and form product pieces having a serpentine edge.

17. A method of producing laminated food product pieces which comprises the steps of processing edible dough forming starch containing materials to produce a plurality of dissimilar doughs having markedly different viscosities, moving streams of said different doughs under high fluid pressure into contact to form a layered stream of dough, moving said layered stream through a restricted passageway into a zone of reduced pressure under conditions producing a strong bond between contacting dough layers while allowing said different viscosity doughs to flow at different rates at the outer edges of the extrudate to modify the shape of the extrudate.

References Cited

UNITED STATES PATENTS

| | | | |
|---|---|---|---|
| 3,499,766 | 3/1970 | Vollink et al. | 99—81 |
| 3,690,896 | 9/1972 | Maxwell | 99—82 |
| 2,788,277 | 4/1957 | Huber | 99—83 |
| 3,506,454 | 4/1970 | Reesman | 99—81 |
| 3,213,808 | 10/1965 | Schafer | 99—138 R |

RAYMOND N. JONES, Primary Examiner

U.S. Cl. X.R.

426—141, 142, 347, 440, 502